(12) United States Patent
Kim et al.

(10) Patent No.: US 10,090,757 B2
(45) Date of Patent: Oct. 2, 2018

(54) POWER FACTOR CORRECTION CIRCUIT AND METHOD

(71) Applicant: FAIRCHILD SEMICONDUCTOR CORPORATION, Sunnyvale, CA (US)

(72) Inventors: Jintae Kim, Sungnam-si (KR); Sangcheol Moon, Bucheon (KR); Hangseok Choi, Suwon (KR)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 0 days.

(21) Appl. No.: 15/673,011

(22) Filed: Aug. 9, 2017

(65) Prior Publication Data

US 2018/0054113 A1    Feb. 22, 2018

Related U.S. Application Data

(60) Provisional application No. 62/377,292, filed on Aug. 19, 2016.

(51) Int. Cl.
*H02M 1/42*    (2007.01)
*H02M 1/08*    (2006.01)
(Continued)

(52) U.S. Cl.
CPC ......... *H02M 1/4241* (2013.01); *H02M 1/083* (2013.01); *H02M 7/06* (2013.01); *H02M 2001/0048* (2013.01)

(58) Field of Classification Search
CPC ...... H02M 1/4241; H02M 1/083; H02M 7/06; H02M 2001/0048
See application file for complete search history.

(56) References Cited

U.S. PATENT DOCUMENTS

| 5,508,602 | A | * | 4/1996 | Borgato | ................ | H02M 3/156 |
| | | | | | | 323/222 |
| 5,818,707 | A | * | 10/1998 | Seong | ................ | H02M 1/4225 |
| | | | | | | 363/89 |

(Continued)

OTHER PUBLICATIONS

Fairchild Semiconductor Corporation, is now part of ON Semiconductor, "FAN7930 Critical Conduction Mode PFC Controller," Apr. 2010.

(Continued)

*Primary Examiner* — Jue Zhang
(74) *Attorney, Agent, or Firm* — AMPACC Law Group, PLLC

(57) ABSTRACT

A Power Factor Correction (PFC) circuit includes an oscillator circuit. The oscillator circuit receives a valley detect signal indicating a zero current condition, determines a blanking time according to an operational cycle of the PFC circuit, and determines to initiate the operational cycle according to the valley detect signal and the blanking time. Determining the blanking time includes selecting one of a plurality of predetermined blanking times according to a count of operational cycles of the PFC circuit. The PFC circuit may operate in a Boundary Conduction Mode or a Discontinuous Conduction Mode depending on whether a charge-discharge period is greater than the blanking time. The PFC circuit may determine, according to its output voltage, a first duration of a charging period, determine a delay time according to zero current times of previous operational cycles, and extend the first duration of the charging period by the delay time.

18 Claims, 7 Drawing Sheets

(51) Int. Cl.
*H02M 7/06* (2006.01)
*H02M 1/00* (2006.01)

(56) References Cited

U.S. PATENT DOCUMENTS

| | | | | |
|---|---|---|---|---|
| 7,391,631 B2* | 6/2008 | Shimada | ............... | H02M 3/157 |
| | | | | 323/283 |
| 8,525,501 B2* | 9/2013 | Hsieh | ........................ | G05F 1/70 |
| | | | | 323/283 |
| 2015/0311810 A1* | 10/2015 | Chen | ................. | H02M 3/33523 |
| | | | | 363/21.13 |
| 2015/0334795 A1* | 11/2015 | Strijker | .............. | H05B 33/0815 |
| | | | | 315/291 |
| 2016/0380533 A1* | 12/2016 | Jin | ......................... | G01R 19/04 |
| | | | | 323/282 |

OTHER PUBLICATIONS

Semiconductor Components Industries, LLC, "NCP1602 Enhanced, High-Efficiency Power Factor Controller," Rev. 4, Aug. 2017.

* cited by examiner

POWER FACTOR CORRECTION CIRCUIT AND METHOD

CROSS-REFERENCES TO RELATED APPLICATIONS

This application claims the benefit of U.S. Provisional Application No. 62/377,292, filed Aug. 19, 2016, which is incorporated by reference in its entirety.

FIELD OF THE DISCLOSURE

The present disclosure relates generally to electronic circuits, and more particularly to electronic circuits the provide Power Factor Correction (PFC) for a load.

BACKGROUND

When a load on an Alternating Current (AC) power source is not a linear load (i.e., the load is a non-linear load) the current being drawn from the AC power source may be out of phase with the voltage of the AC power source. A purely resistive load is a linear load. A load having an energy storage component (such as an inductance or a capacitance) may be a non-linear load. A load that draws power irregularly over the course of a cycle of the AC power source, such as a rectifier or a Switch Mode Power Supply (SMPS), may be a non-linear load.

When the current being drawn by a non-linear load from the AC power source is out of phase with the voltage of the AC power source, the current being drawn from the AC power source will be higher, on average, than it would be if the current and voltage were in phase. This can cause power to be wasted and damage to occur in the AC power source.

The degree to which the current drawn by a load from the AC power source is in phase with the voltage of the AC power source may be expressed as the Power Factor (PF) of the load. An ideal linear load has a PF of 1, and non-linear loads have a PF less than one.

A PFC circuit may be provided between an AC power source and a load. The PFC circuit operates to present a PF close to 1 (e.g., 0.98) to the AC power source by keeping the phase of current drawn from the AC power source close to the phase of the voltage of the AC power supply, even when the phase of the current drawn by the load is out of phase or irregular.

It is desirable for a PFC circuit to maintain a high level of efficiency as the current drawn by the load varies and as the voltage of the AC power source varies. It is desirable for a PFC circuit to not subject the AC power source to glitches or other distortions in the current drawn from the AC power source.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
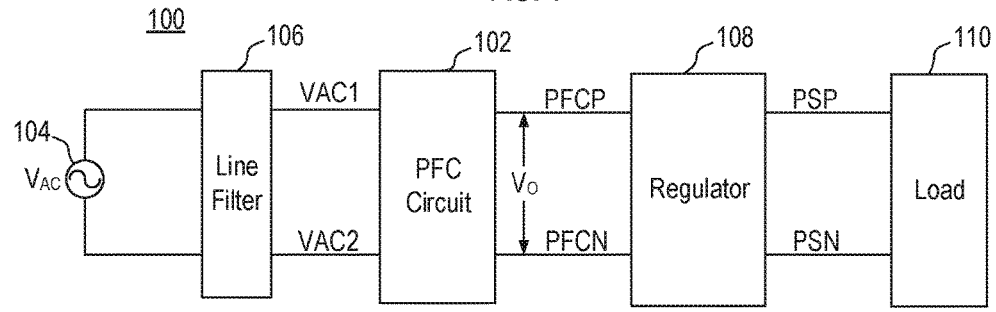
FIG. 1 illustrates an electrical system including a Power Factor Correction (PFC) circuit according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

The present disclosure relates generally to electronics, and more particularly to a Power Factor Correction (PFC) circuit.

Embodiments operate at high efficiency when a current drawn by a load varies. Embodiments operate at high efficiency when a voltage of the AC power supply varies. Embodiments limit an operating frequency of the PFC circuit in order to reduce switching losses.

Embodiments reduce distortion of the waveform of the current drawn from the AC power supply that may arise when the operating frequency of the PFC circuit changes.

A PFC circuit may operate by repeated cycles of charging and discharging an inductor. Each operational cycle includes a charging period during which a current in the inductor is transferring energy from a power source into the inductor, and a discharging period during which the current in the inductor is transferring energy from the inductor to a load.

When the charging and discharging periods of the operational cycle make up the entirety of the operational cycle, the PFC circuit is operating in either a Continuous Conduction Mode (CCM) or a Boundary Conduction Mode (BCM). In both CCM and BCM, the charging period of each cycle is immediately followed by the discharging period of that cycle, and the discharging period of an operational cycle is immediately followed by the charging period of the next operational cycle.

CCM and BCM may be distinguished in that in CCM the current in the inductor never drops to zero during the operational cycle, while in BCM the current drops to zero at the end of the discharge period of each operational cycle, and then immediately resumes when the charging period of the subsequent operational cycle begins. BCM may be said to operate at the boundary between CCM and Discontinuous Conduction Mode (DCM).

Discontinuous Conduction Mode (DCM) occurs when the operational cycle may include a substantial period during which the inductor is neither being charged or discharged, during which the net inductor current (excluding ringing caused by interaction between the inductor and other reactive elements of the circuit) is zero. Thus, in a PFC circuit operating in DCM, each operational cycle includes a charging period, a discharging period, and a zero current period.

Figure 2A:
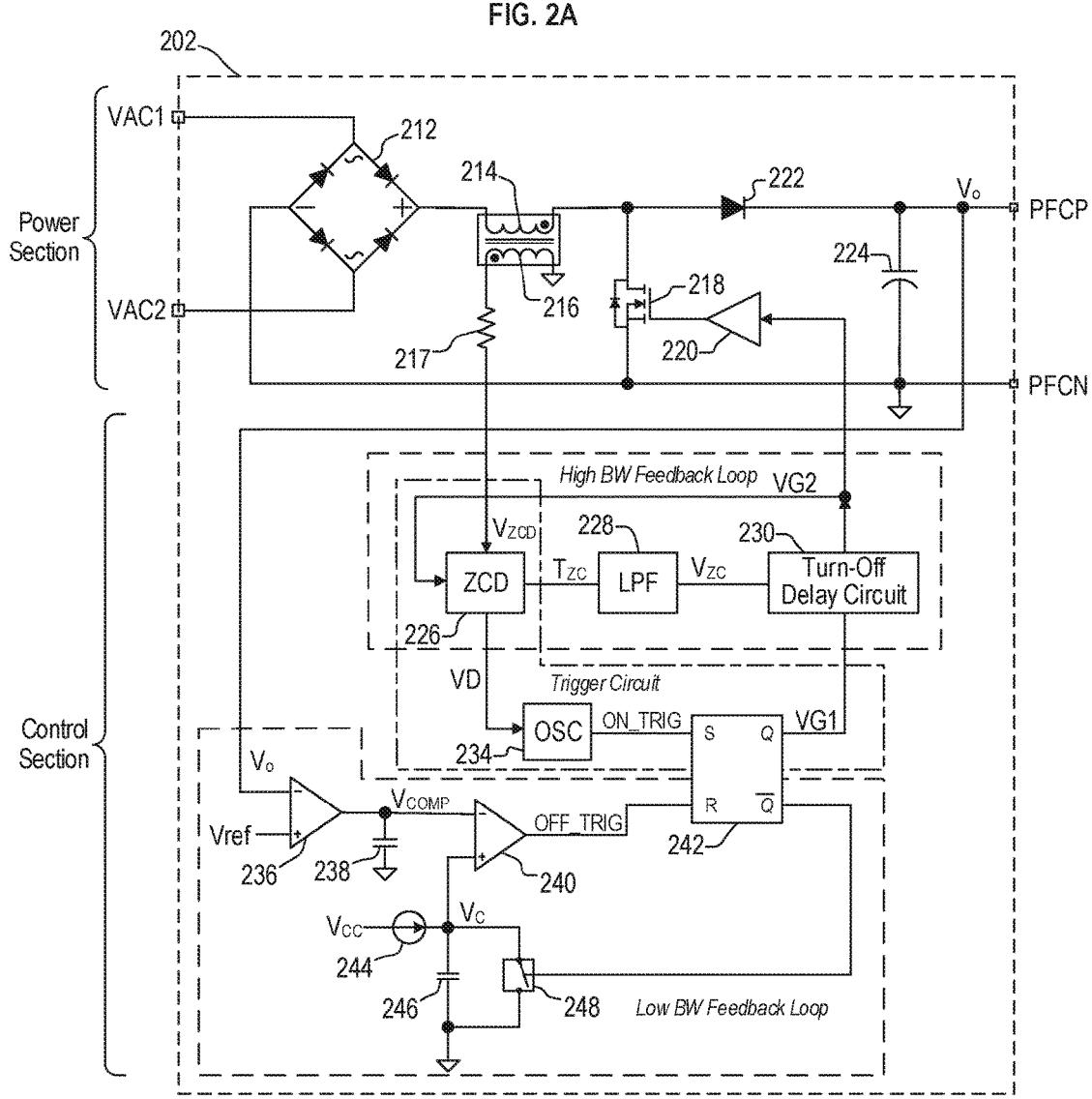
FIG. 2A illustrates a PFC circuit according to an embodiment.
Figure 2B:
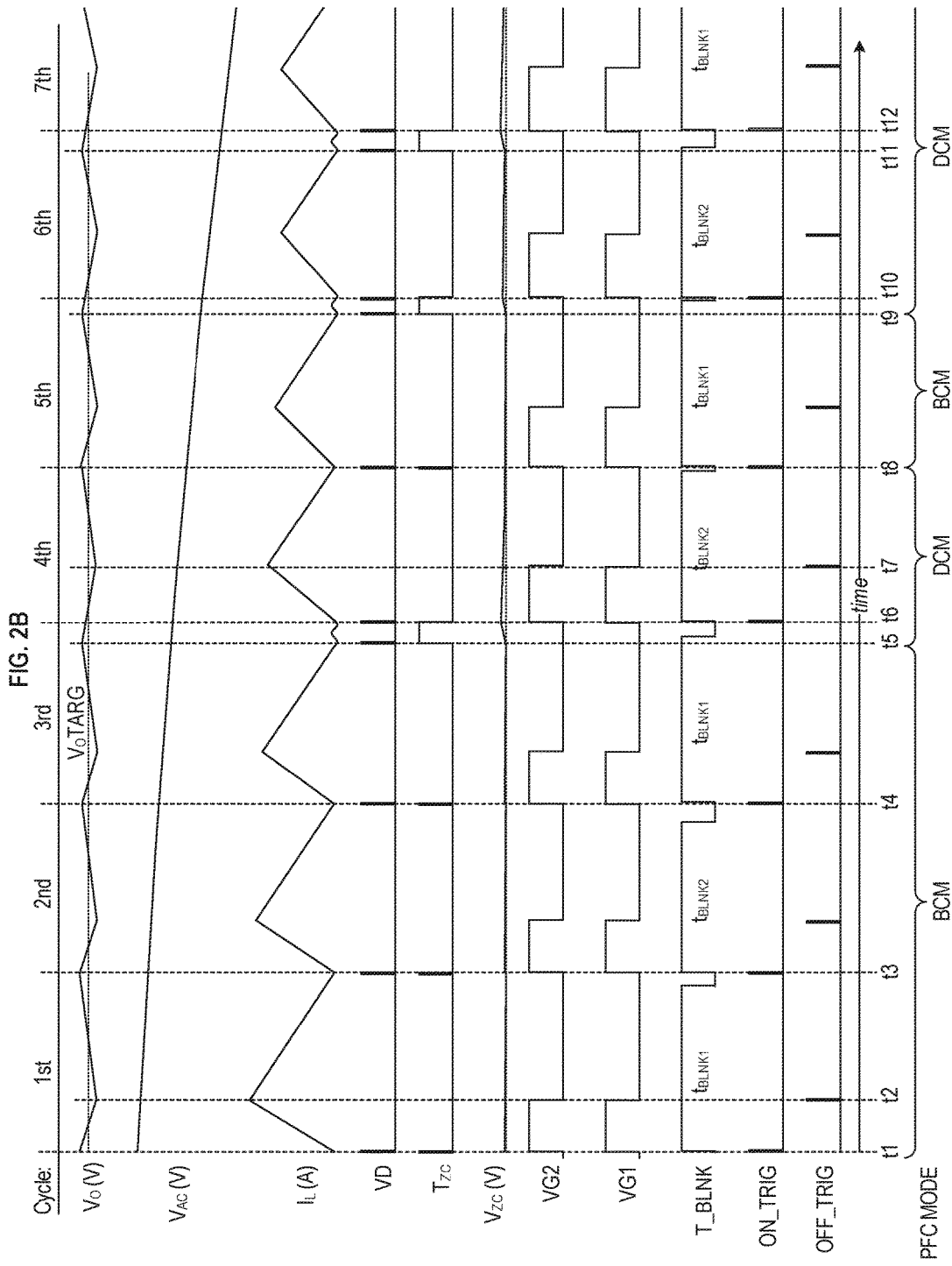
FIG. 2B includes waveforms illustrating operations of a PFC circuit according to an embodiment.

The first, second, and fourth cycles shown in FIG. 2B illustrate operation in BCM, wherein the inductor current $I_L$ is zero only momentarily at the start of each cycle. The third, fifth, and sixth cycles shown in FIG. 2B illustrate operation in DCM, wherein portions of each cycle (i.e., in the intervals between times t5 and t6, between times t9 and t10, and between times t11 and t12) the only current flowing in the inductor is current due to ringing.

In an embodiment, a PFC circuit operates at times in BCM and at other times in DCM, with the mode being determined according to one or more predetermined blanking times and a duration of a current flow through an energy storage inductor of the PFC circuit. The predetermined blanking times correspond to periods of time after each imitation of a charging period (that is, after the start of each operational cycle) during which a new initiation of a charging period (that is, the start of new cycle) is prevented. The predetermined blanking times correspond to a maximum allowable operating frequency (that is, a minimum period of the operational cycle) of the PFC circuit.

In an embodiment, charging of the inductor is initiated in response to a current through the inductor being substantially zero. In an embodiment, the current through the inductor becomes zero a plurality of times in an operational cycle during a zero current period that occurs after the charging and discharging periods of the cycle are complete. The current through the inductor becomes zero a plurality of times during the zero current period because of ringing caused by a resonance in the PFC circuit. The times during the ringing when the current is zero may be referred to as valleys. Valleys are numbered according to the order of their occurrence after the end of the charge-discharge cycle of the inductor, with the first occurrence of zero current at the end of the discharge period of the operational cycle being the first valley.

In an embodiment, the PFC circuit initiates charging of the inductor in response to detection of a valley after the blanking time has elapsed, which may be an $N^{th}$ valley, where N is an integer greater than or equal to 1. The value of N may vary according to a load on the PFC circuit and according to an instantaneous voltage of the AC power supplied to the PFC circuit.

In an embodiment, the blanking time being used by the PFC circuit is periodically varied between two or more predetermined blanking times to smooth out a transition from an $N^{th}$ valley to an $(N-1)^{th}$ or $(N+1)^{th}$ valley.

In an embodiment, when the PFC circuit is operating in DCM, an off time of a charging period of the inductor is delayed according to a duty cycle of the current flowing through the inductor in one or more previous operational cycles, using a closed loop feedback circuit. The delaying of the off time extends the duration of the charging period, which enables a lower maximum operational frequency for the PFC circuit and prevents distortions that can be caused by open-loop control of the off time. The closed loop feedback circuit may operate by determining a zero current value according to the duration of the zero current period of an operational cycle and then delaying the off time of the charging period of the subsequent cycle by an amount proportional to the zero current value.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Similar reference numerals may designate similar elements in the specification.

FIG. 1 illustrates an electrical apparatus 100 including a Power Factor Correction (PFC) circuit 102 according to an embodiment. The electrical apparatus 100 also includes an AC power supply 104, a line filter 106 (also known as an Electro-Magnetic Interference (EMI) filter), a regulator 108, and a load 110.

The AC power supply 104 supplies current to the PFC circuit 102 through the line filter 106. The current is an Alternating Current (AC). In an illustrative embodiment, the AC power supply has a Root-Mean-Square (RMS) voltage between 90 and 240 volts.

The line filter 106 may be a low-pass filter that operates to suppress the propagation of high-frequency signals (for example, frequencies above 9 KHz) from the PFC circuit 102 to the AC power supply 104. The line filter 106 may include one or more inductors, chokes, and capacitors. The line filter 106 outputs first and second AC voltages VAC1 and VAC2.

The PFC circuit 102 converts the power received through the first and second AC signals VAC1 and VAC2 into Direct Current (DC) power and delivers the power through positive and negative PFC output signals PFCP and PFCN. In an illustrative embodiment, a voltage difference between the positive and negative PFC output signals PFCP and PFCN is substantially greater than a peak voltage of the AC power supply. For example, when the PFC circuit 102 is designed to operate with AC power sources ranging from 90 to 240 volts, the voltage difference between the positive and negative PFC output signals PFCP and PFCN (i.e., the output voltage Vo of the PFC circuit 102) may be 400 volts.

The regulator 108 produces positive and negative power supply voltages PSP and PSN using the power delivered from the PFC circuit 102. An example regulator 108 may be a Switch Mode Power Supply (SMPS) that converts the 400V power supplied by the PFC circuit to 12 volts. The regulator 108 delivers power to the load 110 through the positive and negative power supply voltages PSP and PSN.

FIG. 2 illustrates a PFC circuit 202 according to an embodiment. The PFC circuit 202 is suitable for use in the PFC circuit 102 of FIG. 1. The PFC circuit 202 receives AC power over first and second AC power signals VAC1 and VAC2 and provides DC power on positive and negative PFC output signals PFCP and PFCN. The PFC circuit 202 operates as a boost converter that produces an output voltage Vo that is DC and that has a magnitude greater than the peak voltage of the AC power that the PFC circuit 202 receives. For example, in an embodiment, the PFC circuit 202 is operable to receive AC power in the range of 90 to 240 volts RMS (having peak voltages in the range of 125 to 340 volts), and to produce 400 V DC power from the AC power.

The PFC circuit 202 comprises a power section and a control section. The power section of the PFC circuit 202 includes a full-wave bridge rectifier 212, an inductor 214, a current sense coil 216, a current sense resistor 217, a power switch 218, a switch driver 220, a diode 222, and an output capacitor 224. In the illustrative embodiment shown, the power switch 218 is a transistor, for example, an n-channel Metal Oxide Semiconductor Field Effect Transistor (nMOSFET). The power section in the illustrated embodiment comprises a boost converter for producing DC power from AC power.

The control section of the PFC circuit 202 comprises a Zero Current Detection (ZCD) circuit 226, a Low-Pass Filter (LPF) circuit 228, a turn-off delay circuit 230, an oscillator 234, a switch control flip-flop 242, a differential amplifier 236, a filter capacitor 238, a comparator 240, a current source 244, a ramp capacitor 246, and a ramp reset switch 248. In an embodiment, the ramp reset switch 248 is a transistor, for example, an nMOSFET.

In the power section, the bridge rectifier 212 rectifies the AC power to provide a pulsating DC voltage. In the embodiment shown, the positive output of the bridge rectifier 212 is coupled to a first terminal of the inductor 214, and a negative terminal of the bridge rectifier 212 is coupled to a ground and to the negative PFC output signal PFCN.

The inductor 214 is used as an energy storage device. The inductor 214 is inductively coupled to the current sense coil 216, so that a current flowing in the inductor 214 generates a corresponding sense current in the current sense coil 216. In an illustrative embodiment, the inductor 214 has an inductance of 200 µHenry (µH) and comprises 30 to 40 turns of wire wound on a ferrite core, and the current sense coil 216 comprises 3 to 5 turns of wire wound on the same ferrite core.

The power switch 218 is coupled between a second terminal of the inductor 214 and the negative terminal of the bridge rectifier 212. The power switch 218 controls the charging and discharging of the inductor 214. When the power switch 218 is turned on, a current can flow from the positive terminal of the bridge rectifier 212 through the inductor 214 and power switch 218 and back to the negative terminal of the bridge rectifier 212, charging the inductor 214. When the switch is turned off, current flowing through the inductor 214 may flow through the diode 222 into the output capacitor 224, thereby discharging the inductor 214 and performing one or both of charging the output capacitor 224 and providing current through the positive and negative PFC output signals PFCP and PFCN.

The gate driver 220 drives the control terminal (in FIG. 2A, the gate of the nMOSFET) of the power switch 218 according to the value of a modified switch control signal VG2. The gate driver 220 may perform one or more of voltage level shifting, control circuit isolation and protection, and enhancement of the performance of the power switch 218. In an embodiment, the gate driver 220 may be omitted and the power switch 218 controlled directly by the modified switch control signal VG2.

The diode 222 operates to allow the inductor 214 to charge the output capacitor 224 and to prevent a backward flow of current from the output capacitor 224 to the inductor 214. The output capacitor 224 stores energy for supplying the output voltage Vo to a load via the positive and negative PFC output signals PFCP and PFCN.

A first terminal of the current sense coil 216 is coupled to ground. A second terminal of the current sense coil 216 provides a zero current detection voltage $V_{ZCD}$ to the ZCD circuit 226 of the control section through a resistor 217. In an embodiment, the resistor 217 operates to limit a voltage of the zero current detection voltage $V_{ZCD}$ by limiting a current from the current sense coil 216.

The control section comprises a trigger circuit and two feedback loop circuits. Some components of the control section are shared between these three circuits.

The trigger circuit determines when to turn the power switch 218 on, and comprises the ZCD circuit 226, the oscillator 234, and the switch control flip-flop 242.

The first feedback circuit is a low bandwidth feedback loop that determines an on duration of the power switch 218 according to the output voltage Vo. The low bandwidth feedback loop comprises the switch control flip-flop 242, the differential amplifier 236, the filter capacitor 238, the comparator 240, the current source 244, the ramp capacitor 246, and the ramp reset switch 248. In an embodiment, the bandwidth of the low bandwidth feedback loop is 20 to 30 Hz or less.

The second feedback circuit is a high bandwidth feedback loop that modifies the on duration determined by the low bandwidth feedback loop according to a duty cycle of the current in the inductor 214, e.g., according to an amount of time spent in a zero current period in previous operational cycles of the PFC 202. The high bandwidth feedback loop includes the ZCD circuit 226, the LPF circuit 228, and the turn-off delay circuit 230.

The Zero Current Detect (ZCD) circuit 226 receives the zero current detection voltage $V_{ZCD}$ and the modified switch control signal VG2. Using the received signals, the ZCD circuit 226 provides a zero current time signal $T_{ZC}$ for use in the high bandwidth feedback loop and a valley detect signal VD for use in the trigger circuit.

The ZCD circuit 226 generates the zero current time signal $T_{ZC}$ having a first state (such as a 1 or logical true state; this may be referred to herein as asserting the signal) during periods of time when the inductor 214 is either charging or discharging. The Zero Current Detect (ZCD) circuit 226 generates the zero current time signal $T_{ZC}$ having a second state (such as a 0 or logical false state; this may be referred to herein as de-asserting the signal) when the inductor 214 is neither charging nor discharging.

The ZCD circuit 226 generates a pulse on the valley detect signal VD in response to detecting that no current is flowing in the inductor 214. Due to interactions between reactive elements in the power section of the PFC circuit 202, there may be times when current (for example, a current due to ringing) is flowing in the inductor 214 when the inductor 214 is not being charged through the power switch 218 and not being discharged through the diode 222. The behavior of the ZCD circuit is discussed in detail below with respect to FIGS. 2B and 2C.

The LPF circuit 228 filters the zero current time signal $T_{ZC}$ to produce a zero current voltage signal $V_{ZC}$ having a voltage value corresponding to an amount of time in previous operational cycles that the inductor 214 was neither charging nor discharging, such times being referred to herein as zero current times. In an embodiment, the LPF circuit 228 has a time constant that is less than four to ten times a maximum period of the zero current time signal $T_{ZC}$. In another embodiment, the LPF circuit 228 has a time constant that is less than four to ten times a period of a maximum operating frequency of the PFC circuit 202. In an illustrative embodiment wherein the maximum period of the zero current time signal $T_{ZC}$ is 5 µs, the time constant of the LPF may be 20 to 50 µs.

In the illustrated embodiment, the value of the zero current voltage signal $V_{ZC}$ is higher when the zero current time is a larger proportion of the recent operational cycles. Because the zero current time only occurs when the PFC circuit 202 is operating in Discontinuous Conduction Mode (DCM), the zero current voltage signal $V_{ZC}$ has a value of zero when the PFC circuit 202 is operating in Boundary Conduction Mode (BCM).

The turn-off delay circuit 230 generates the modified switch control signal VG2 from the switch control signal VG1. In an embodiment wherein the modified switch control signal VG2 being high causes the power switch to be turned on, rising edges of the modified switch control signal VG2 are generated immediately in response to respective rising edges of the switch control signal VG1, and falling edges of the modified switch control signal VG2 are generated a delay period after respective falling edges of the switch control signal VG1. The delay period is determined by the value of the zero current voltage signal $V_{ZC}$.

As a result, the turn-off delay circuit 230 operates to extend a length of the turn-on time determined by the low bandwidth feedback loop. The duration of the extension is determined according to the zero current voltage signal $V_{ZC}$ produced be the high bandwidth feedback loop, and is zero when the PFC circuit 202 is operating in BCM mode.

The oscillator 226 receives the modified switch control signal VG2 and the valley detect signal VD and generates the turn-on trigger signal ON_TRIG, which indicates when the power switch 218 is to be turned on. The oscillator 226 generates a pulse on the turn-on trigger signal ON_TRIG in response to the valley detect signal VD being asserted after a blanking interval has expired. The blanking interval is initiated by the most recent pulse on the turn-on trigger signal ON_TRIG. A value of the blanking interval corresponds to a maximum operating frequency of the PFC circuit 202, and may be determined during the design of the PFC circuit 202.

In an embodiment, the blanking interval sequences through a plurality of blanking time values. For example, the blanking interval may alternate between two blanking time values, with odd cycles of the operation of the PFC circuit 202 using a first blanking time value and even cycles of the operation of the PFC circuit 202 using a second blanking time value. In an illustrative embodiment, the oscillator 226 may employ a 7 microsecond (μs) blanking time value for every second operational cycle of the PFC circuit 202, and employ a 7.2 μs blanking time value for the remaining operational cycles of the PFC circuit 202.

By using two or more blanking time values in such a manner, the oscillator 226 operates to reduce distortions in the current drawn from the AC power supply that can occur when the interval between successive turn-ons of the power switch 218 (that is, the duration of the operational cycle of the PFC circuit 202) changes when the PFC circuit 202 is in DCM.

Turning to the low bandwidth feedback loop, the differential amplifier 236 generates a comparison voltage $V_{COMP}$ by subtracting the output voltage $V_O$ from a reference voltage Vref. The comparison voltage $V_{COMP}$ corresponds to a difference between the output voltage $V_O$ and a target output voltage $V_O$TARG. In an embodiment, the output voltage $V_O$ is first reduced using a voltage divider before being subtracted from the reference voltage Vref, and the target output voltage $V_O$TARG corresponds to N times the reference voltage Vref, where N is the amount that the voltage divider divides the output voltage Vo by.

The filter capacitor 238 operates to low-pass filter the comparison voltage $V_{COMP}$, to prevent ripple in the output voltage Vo from creating instability in the low bandwidth feedback loop.

The current source 244, ramp capacitor 246, and ramp reset switch 248 operate to generate a ramp voltage $V_C$. The ramp voltage $V_C$ is held at zero by the ramp reset switch 248 when the switch control signal VG1 is low. When the switch control signal VG1 goes high, the ramp voltage $V_C$ rises at rate determined by the current provided by the current source 244 and the capacitance of the ramp capacitor 246.

The comparator 240 compares the comparison voltage $V_{COMP}$ to the ramp voltage $V_C$ to generate the turn-off signal OFF_TRIG. When the comparison voltage $V_{COMP}$ is greater than the ramp voltage $V_C$, the comparator 240 de-asserts the turn-off signal OFF_TRIG. When the comparison voltage $V_{COMP}$ is less than the ramp voltage $V_C$, the comparator 240 asserts the turn-off signal OFF_TRIG.

Because the ramp voltage $V_C$ is held at zero until the switch control signal VG1 goes high and rises steadily for as long as the switch control signal VG1 remains high, the comparator 240 asserts the turn-off signal OFF_TRIG after a delay, relative to the assertion of the switch control signal VG1, that is proportional to the comparison voltage $V_{COMP}$, that is, that is proportional to a difference between the output voltage $V_O$ and the target output voltage. As a result, the duration of the switch control signal VG1 being asserted (that is, the pulse width of the switch control signal VG1) is modulated to maintain the output voltage $V_O$ substantially equal (ignoring ripple) to the target output voltage $V_O$TARG.

The switch control flip-flop 242 generates the switch control signal VG1 according to the turn-on trigger signal ON_TRIG and the turn-off signal OFF_TRIG. The switch control flip-flop 242 asserts the switch control signal VG1 when the turn-on trigger signal ON_TRIG is asserted and de-asserts the switch control signal VG1 when the turn-off signal OFF_TRIG is asserted. The switch control flip-flop 242 provides a signal complementary to the switch control signal VG1 via its inverted (Q-bar) output.

FIG. 2B includes waveforms illustrating operations of the PFC circuit 202 in Boundary Conduction Mode (BDM) and Discontinuous Conduction Mode (DCM) according to an embodiment. The waveforms include the output voltage $V_O$, shown relative to the target output voltage $V_O$TARG, the AC power source voltage $V_{AC}$, and the inductor current $I_L$ through the inductor 214. The waveforms further include control signals: the valley detect signal VD, the zero current time signal $T_{ZC}$, the zero current voltage signal $V_{ZC}$, the modified switch control signal VG2, the switch control signal VG1, a blanking signal T_BLNK that indicates when a blanking interval is in effect in the oscillator 234, and the turn-on trigger signal ON_TRIG.

FIG. 2B illustrates a situation in which a decrease in the instantaneous value of the AC power source voltage $V_{AC}$ causes a reduction in the cycle time (i.e. an increase in the operating frequency) of the PFC circuit 202. In FIG. 2B, the cycle time of the PFC circuit 202 decreases until it reaches a predetermined design blanking time (corresponding to a maximum operating frequency), at which time the PFC circuit 202 operation changes from BCM to DCM.

At a first time t1, the valley detect signal VD pulses high to indicate detection of a zero current condition in the inductor 214. Because there is not a blanking interval in effect at the first time t1, the pulse on the valley detect signal VD causes the oscillator 234 to generate a pulse on the turn-on trigger signal ON_TRIG, and triggers the blanking interval in the oscillator 234. In the embodiment, the blanking time triggered at the first time t1 has a duration according to a first blanking time value $t_{BLNK1}$.

The pulse on the turn-on trigger signal ON_TRIG causes the switch control flip-flop 242 to assert the switch control signal VG1. The assertion of the switch control signal VG1 causes the assertion of the modified switch control signal VG2, which causes the power switch 218 to be turned on. Assertion of the modified switch control signal VG2 also causes the ramp voltage $V_C$ of the low bandwidth feedback loop (not shown) to begin increasing from zero so that the charging period for this operational cycle may be determined.

While the modified switch control signal VG2 is asserted, the inductor 214 charges through the power switch 218, and the ramp voltage $V_C$ continues to increase.

At a second time t2, the ramp voltage $V_C$ exceeds the comparison voltage Vcomp (not shown), causing the comparator 240 to assert the turn-off signal OFF_TRIG.

The assertion of the turn-off signal OFF_TRIG causes the switch control signal VG1 to be de-asserted. Because the PFC circuit 202 is operating in BCM at the second time t2, the turn-off delay circuit 230 immediately de-asserts the modified switch control signal VG2 in response to the de-assertion of the switch control signal VG1.

The de-assertion of the modified switch control signal VG2 causes the power switch 218 to turn off, which causes the inductor 214 to begin discharging through the diode 222 into the output capacitor 224. The de-assertion of the modified switch control signal VG2 also cause the ramp voltage $V_C$ to be reset to 0, which causes the turn-off signal OFF_TRIG to be de-asserted.

At a third time t3, the valley detect signal VD again pulses high to indicate detection of a zero current condition in the inductor 214. This zero current condition may be referred to as occurring in the first valley of the current in the inductor 214. As indicated by the blanking signal T_BLNK, the blanking interval is no longer in effect at the third time t3. As a result, the oscillator 234 generates a pulse on the turn-on trigger signal ON_TRIG, and the operations described above with respect to the first and second times t1 and t2 repeat. However, in the embodiment, the blanking time triggered at the third time t3 has a duration according to a second blanking time value $t_{BLNK2}$. In the illustrated embodiment, the second blanking time value $t_{BLNK2}$ is less than the first blanking time value $t_{BLNK1}$.

At a fourth time t4, the valley detect signal VD again pulses high to indicate detection of a zero current condition in the inductor 214. In the example shown, the interval between the third and fourth times t3 and t4 is shorter than the interval between the first and third times t1 and t3 because of the decrease in the value of the AC power source voltage $V_{AC}$ that occurs during the interval between the first and fourth times t1 and t4.

As indicated by the blanking signal T_BLNK, the blanking interval is no longer in effect at the fourth time t4. As a result, the oscillator 234 generates a pulse on the turn-on trigger signal ON_TRIG, and the operations described above with respect to the first and second times t1 and t2 repeat. In the embodiment, and like at the first time t1, the blanking time triggered at the fourth time t4 has a duration according to the first blanking time value $t_{BLNK1}$.

At a fifth time t5, the valley detect signal VD again pulses high to indicate detection of a zero current condition in the inductor 214. In the example shown, the interval between the fourth and fifth times t4 and t5 is shorter than the interval between the third and fourth times t3 and t4 because of the decrease in the value of the AC power source voltage $V_{AC}$ that occurs during the interval between the third and fifth times t3 and t5.

However, as indicated by the blanking signal T_BLNK, the blanking interval is still in effect at the fifth time t5. As a result, the oscillator 234 does not generate a pulse on the turn-on trigger signal ON_TRIG, and the PFC circuit 202 operates in DCM.

At a sixth time t6, due to ringing in the current through the inductor 214, the valley detect signal VD again pulses high to indicate detection of a zero current condition at a second valley in the ringing of the current in the inductor 214. As indicated by the blanking signal T_BLNK, the blanking interval is no longer in effect at the sixth time t6. As a result, the oscillator 234 generates a pulse on the turn-on trigger signal ON_TRIG, and the operations described above with respect to the first and second times t1 and t2 repeat with two differences.

First, the blanking time triggered at the sixth time t6 has a duration according to the second blanking time value $t_{BLNK2}$.

Second, in the interval between the fifth and sixth times t5 and t6, the inductor 214 was neither charging through the power switch 218 nor discharging through the diode 222. As a result, the zero current time signal $T_{ZC}$ was asserted during the interval between the fifth and sixth times t5 and t6. As a result of the assertion of the zero current time signal $T_{ZC}$, the zero current voltage $V_{ZC}$ is greater than zero when the switch control signal VG1 is de-asserted at a seventh time t7.

As a result, at the seventh time t7, the turn-off delay circuit 230 delays the de-assertion of the modified switch control signal VG2 by an interval, starting at the time of de-assertion of the switch control signal VG1, proportional to the value of the zero current voltage $V_{ZC}$. This causes the duration of the on time of the power switch 218 to be longer than the on duration determined by the low bandwidth feedback loop for the switch control signal VG1.

At an eighth time t8, the valley detect signal VD again pulses high to indicate detection of a zero current condition in the inductor 214. In the example shown, the interval between the sixth and eight times t6 and t8 is shorter than the interval between the fourth and fifth times t4 and t5 because of the decrease in the value of the AC power source voltage $V_{AC}$ that occurs during the interval between the fourth and eighth times t4 and t8.

However, because the blanking interval initiated at the sixth time t6 has a duration according to the second blanking time value $t_{BLNK2}$, and the second blanking time value $t_{BLNK2}$ corresponds to a shorter duration of the blanking interval than that of the first blanking time value $t_{BLNK1}$, the blanking time is no longer in effect at the eighth time t8. As a result, the oscillator 234 generates a pulse on the turn-on trigger signal ON_TRIG, and triggers the blanking interval in the oscillator 234. The blanking time triggered at the eighth time t8 has a duration according to a first blanking time value $t_{BLNK1}$. Operations then proceed as described for the first time t1, with the PFC circuit 202 operating in BCM (here, for only one cycle).

At a ninth time t9, the valley detect signal VD again pulses high to indicate detection of a zero current condition in the inductor 214. In the example shown, the interval between the eighth and ninth times t8 and t9 is shorter than the interval between the sixth and eighth times t6 and t8 because of the decrease in the value of the AC power source voltage $V_{AC}$ that occurs during the interval between the sixth and ninth times t6 and t9.

As indicated by the blanking signal T_BLNK, the blanking interval is still in effect at the ninth time t9. As a result, the oscillator 234 does not generate a pulse on the turn-on trigger signal ON_TRIG, and the PFC circuit 202 operates in DCM.

At a tenth time t10, the valley detect signal VD again pulses high to indicate detection of a zero current condition at a second valley in the ringing of the current in the inductor 214. As indicated by the blanking signal T_BLNK, the blanking interval is no longer in effect at the tenth time t10. As a result, the oscillator 234 generates a pulse on the turn-on trigger signal ON_TRIG, and the operations described above with respect to the sixth time t6.

Operations at an eleventh time t11 and a twelfth time t12 are the same as operations at the ninth time t9 and the tenth time t10, respectively, except that the blanking time triggered at the twelfth time t12 has a duration according to a first blanking time value $t_{BLNK1}$.

Figure 2C:
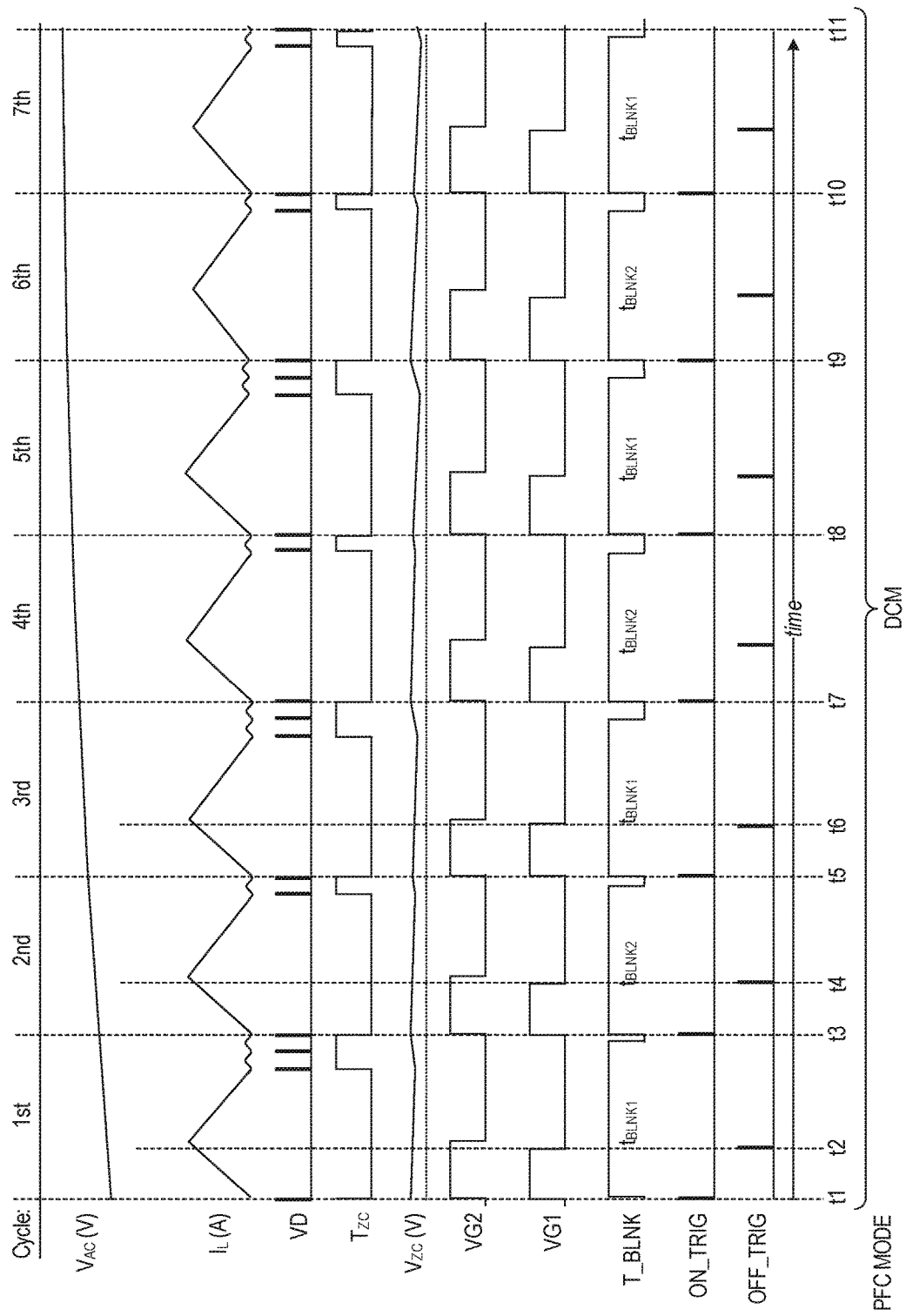
FIG. 2C includes waveforms illustrating additional operations of a PFC circuit according to an embodiment.

FIG. 2C includes waveforms illustrating operations of the PFC circuit 202 in DCM according to an embodiment. The waveforms shown are the same as those shown in FIG. 2B, except the output voltage $V_O$ is not shown. The time scale (i.e. the horizontal axis) of FIG. 2C is slightly compressed compared to the time scale of FIG. 2B.

FIG. 2C illustrates a transition from turning the power switch 218 on in the third valley after the end of the charge-discharge operation of the inductor 214 to turning the power switch 218 on in the third valley after the end of the charge-discharge operation of the inductor 214, wherein the transition is performed according to first and second blanking time values $t_{BLNK1}$ and $t_{BLNK2}$, wherein the PFC circuit 202 alternates between the two blanking time on an operational cycle by operational cycle basis.

At a first time t1, the valley detect signal VD pulses high to indicate detection of a zero current condition in the inductor 214. Here, the pulse corresponds to a third valley of the preceding operational cycle, and there is not a blanking interval in effect at the first time t1. Accordingly, the pulse on the valley detect signal VD causes the oscillator 234 to generate a pulse on the turn-on trigger signal ON_TRIG, and triggers the blanking interval in the oscillator 234. In the example illustrated, the blanking time triggered at the first time t1 has a duration according to a first blanking time value $t_{BLNK1}$.

The PFC circuit 202 then operates as described with respect to the first time t1 of FIG. 2B, except for two difference. First, because of the zero current time of the previous cycle (as reflected in the value of the zero current voltage signal $V_{ZC}$ at a second time t2) the turn-off delay circuit 230 generates the modified switch control signal VG2 with a longer duration than the switch control signal VG1 by delaying the falling edge of the modified switch control signal VG2. This extends the charging time of the inductor 214, allowing more energy to be incorporated into the magnetic field of the inductor 214 during the first cycle.

Second, because of the reduced value of the AC power supply voltage $V_{AC}$ relative to the values shone in FIG. 2B, the charge-discharge operation of the inductor 214 ends earlier than the corresponding charge-discharge cycle initiated at the first time t1 of FIG. 2B. As a result, the first zero crossing to be detected after the blanking interval is no longer in effect occurs in the third valley, at a third time t3.

At the third time t3, a zero current condition is detected in the third valley of the first operational cycle, which is after the end of the blanking time. As a result, a new charge-discharge operation is initiated, as occurred at the first time t1.

However, because the PFC circuit 202 is using the second blanking time value $t_{BLNK2}$ to determine the duration of the blanking interval that follows the third time t3, and because the value of the AC power supply voltage $V_{AC}$ increased during the interval between the first time t1 and the third time t3, the charge-discharge operation of the inductor 214 last longer than the corresponding charge-discharge operation in the previous operational cycle.

As a result, at a fifth time t5, a post-blanking-interval zero current condition is detected in the second valley of the second operational cycle. A new (third) charge-discharge operation is initiated, as occurred at the first time t1, in which the first blanking time value $t_{BLNK1}$ is used to determine the duration of the blanking interval.

Because the zero current time of the second cycle was less than the zero current time of the first cycle (as reflected in the value of the zero current time signal $T_{ZC}$), the value of the zero current voltage signal $V_{ZC}$ is less when the falling edge of the switch control signal occurs in the third cycle (at a sixth time t6) than it was when the falling edge of the switch control signal occurred in the second cycle (at a fourth time t4). As a result, the turn-off delay circuit 230 delays the falling edge of the modified switch control signal VG2 by a smaller interval in the third cycle than it did in the second cycle.

At a seventh time t7, a post-blanking-interval zero current condition is detected in the third valley of the third operational cycle, and operation of the PFC circuit 202 proceeds in a fourth cycle as described for the second cycle that began at the third time t3.

At an eighth time t8, a post-blanking-interval zero current condition is detected in the second valley of the fourth operational cycle, and operation of the PFC circuit 202 proceeds in a fifth cycle as described for the third cycle that began at the fifth time t5.

At a ninth time t9, a post-blanking-interval zero current condition is detected in the third valley of the fifth operational cycle, and operation of the PFC circuit 202 proceeds in a sixth cycle as described for the second cycle that began at the third time t3.

At a tenth time t10, a post-blanking-interval zero current condition is detected in the second valley of the sixth operational cycle, and operation of the PFC circuit 202 proceeds in a fourth cycle as described for the third cycle that began at the fifth time t5.

At an eleventh time t11, a post-blanking-interval zero current condition is detected in the second valley of the seventh operational cycle, and operation of the PFC circuit 202 proceeds in a eighth cycle (not shown) as described for the second cycle.

In summary, FIG. 2C shows the PFC circuit 202 operating in DCM and switching on the third valley in the first cycle and cycles prior thereto (not shown), and then transitioning to switching in the second valley as the instantaneous value of the AC power supply voltage $V_{AC}$ rises over time. The transition from third to second valley switching is made less abrupt be the operation of the two alternating blanking times, so that the pattern of switching is third valley, third valley, second valley, third valley, second valley, third valley, second valley, second valley (i.e., . . . 3, 3, 2, 3, 2, 3, 2, 2, . . . ). In contrast, PFC circuits known in the art transition between which valley they switch in abruptly (i.e., . . . 3, 3, 3, 3, 2, 2, 2, 2 . . . ), which can cause distortions in the current being drawn from the AC power supply.

Although the examples shown have employed two alternating switching times, and have shown a transition from BCM to DCM (i.e. from first valley switching to second valley switching) and a transition from third valley switching to second valley switching, embodiments are not limited thereto, and the may employ the processes described above to make the transition from switching in any valley to switching in any adjacent valley less abrupt.

Figure 3:
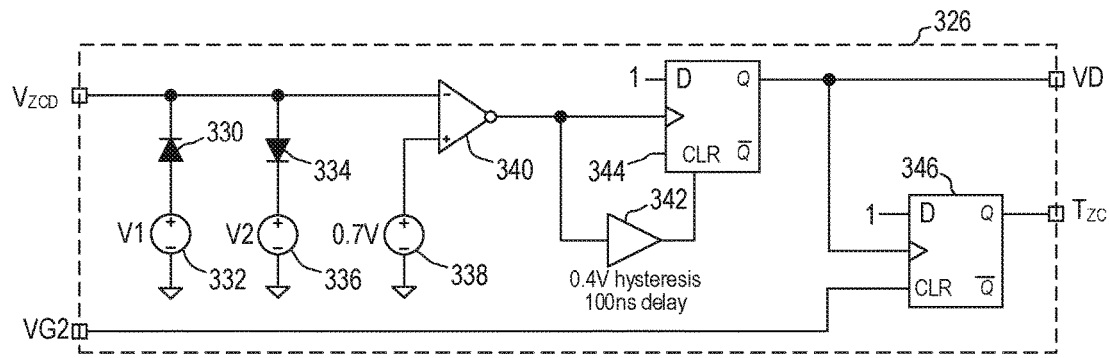
FIG. 3 illustrates a Zero Current Detection (ZCD) circuit according to an embodiment.

FIG. 3 illustrates a Zero Current Detection (ZCD) circuit 326 according to an embodiment. The ZCD circuit 326 is suitable for use in the ZCD circuit 226 of FIG. 2.

The ZCD circuit 326 receives the zero current detection voltage $V_{ZCD}$ and uses it to produce a valley detect signal VD. The ZCD circuit 326 receives the modified switch control signal VG2 and uses it and the valley detect signal VD to produce a zero current time signal $T_{ZC}$. The ZCD circuit 326 comprises first and second diodes 330 and 334; first, second, and third voltage sources 332, 336, and 338, a comparator 340, a buffer 342, a first D-type flip flop 344, and a second D-type flip-flop 346.

The first diode 330 and the first voltage source 332 operate to provide a bias voltage to the zero current detection voltage $V_{ZCD}$. In an embodiment, the bias voltage is −0.7 V. The second diode 334 and the second voltage source 336 operate to clamp the zero current detection voltage $V_{ZCD}$ to a clamp voltage. In an embodiment, the clamp voltage is 5V.

The third voltage source 338 provides a threshold voltage to the comparator 340. In an embodiment, the threshold voltage is 0.7 V. The output of the comparator 340 is de-asserted (e.g., driven low) when the zero current detection voltage $V_{ZCD}$ is greater than the threshold voltage, and is asserted (e.g., driven high) when the zero current detection voltage $V_{ZCD}$ is less than the threshold voltage.

In response to the assertion (e.g., the rising edge) of the output of the comparator 340, the first D-type flip-flop latches a value of "1", and outputs a valley detect signal VD having a value of 1. The output of the comparator 340 is also provided to a buffer 342 that delays it by, for example, 100 nanoseconds. The delayed output of the comparator 340 is provided to a clear input CLR of the first D-type flip-flop 344. As a result, 100 nanoseconds after the rising edge of the output of the comparator 340 caused the first D-type flip-flop 344 to output a valley detect signal VD having a value of 1, the first D-type flip-flop 344 is cleared and the valley detect signal VD is returned to 0.

Accordingly, the ZCD circuit 326 produces the valley detect signal VD having a 100 nanosecond positive-going pulse at the beginning of each period of zero current indicated by the zero current detection voltage $V_{ZCD}$.

The ZCD circuit 326 produces the zero current time signal $T_{ZC}$ by setting the second D-type flip-flop 346 at the rising edge of each pulse on the valley detect signal VD and clearing the second D-type flip-flop 346 when the modified switch control signal VG2 is asserted. As a result, the zero current time signal $T_{ZC}$ is asserted at the first zero current detected in an operational cycle of PFC circuit that includes the ZCD circuit 326, and remains asserted until the charging of the inductor is initiated in the following operational cycle.

Figure 4:
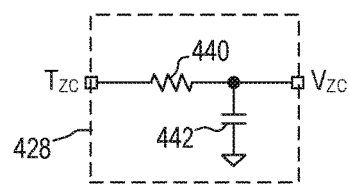
FIG. 4 illustrates a Low Pass Filter (LPF) circuit according to an embodiment.

FIG. 4 illustrates a Low Pass Filter (LPF) circuit 428 according to an embodiment. The LPF circuit produces the zero current voltage signal $V_{ZC}$ from the zero current time signal $T_{ZC}$. The LPF circuit 428 is suitable for use in the LPF circuit 228 of FIG. 2.

The LPF circuit 428 comprises a resistor 440 and a capacitor 442 coupled together as a as a low pass Resistor-Capacitor (RC) filter. In an embodiment, a time constant of the RC filter is determined according to a minimum cycle time of operation of the PFC circuit, such as by being a few times the minimum cycle time. In an illustrative embodiment having a minimum cycle time of operation of 5 µs, for example, a time constant of the RC filter may be 20 µs.

Figure 5A:
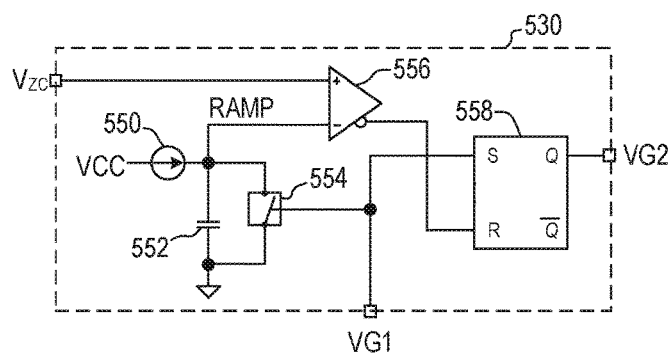
FIG. 5A illustrates a turn-off delay circuit according to an embodiment.

FIG. 5A illustrates a turn-off delay circuit 530 according to an embodiment, suitable for use in the turn-off delay circuit 230 of FIG. 2. The turn-off delay circuit 530 receives the switch control signal VG1 and the zero current voltage signal $V_{ZC}$ and produces a modified switch control signal VG2 from the received signals. The modified switch control signal VG2 has rising edges that occur as immediate responses to respective rising edges of the switch control signal VG1, and has falling edges that occur as delayed responses to respective falling edges of the switch control signal VG1. The amount of the delay used to generate the falling edges is determined according to the voltage value of the zero current voltage signal $V_{ZC}$. In an embodiment, the delay used to generate the falling edges may range from 0 to 1 µs according to the value of the zero current voltage signal $V_{ZC}$, with a 0 µs corresponding to the zero current voltage signal $V_{ZC}$ having a value of 0V.

The turn-off delay circuit 530 comprises a current source 550, a capacitor 552, a reset switch 554, a comparator 556, and a set-reset (SR) flip-flop 558. The current source 550 is connected to a first terminal of the capacitor 552, and the second terminal of the capacitor 552 is connected to ground. The reset switch 554 has first and second conduction terminals respectively connected to the first and second terminals of the capacitor 552, and a control terminal connected to the switch control signal VG1. In an illustrative embodiment, the current source 550 provides 1 milliamp (mA) of current, the capacitor 552 has a capacitance of 1 nanoFarad (nF), and the reset switch 554 is an n-channel MOSFET.

The current source 550, capacitor 552, and reset switch 554 operate to provide a ramp signal RAMP to a negative input of the comparator 556. The ramp signal RAMP has a voltage value of 0V when the switch control signal VG1 is asserted, and has a voltage value that increases when the switch control signal VG1 is de-asserted. In an illustrative embodiment, the voltage value of the ramp signal RAMP increases at a rate of 1 V/µs.

The comparator 556 compares the ramp signal RAMP to the zero current voltage signal $V_{ZC}$. The comparator 556 de-asserts its output when the ramp signal RAMP is less than the zero current voltage signal $V_{ZC}$, and asserts it when the ramp signal RAMP is greater than the zero current voltage signal $V_{ZC}$. As a result, the output of the comparator 556 is asserted at a delay of $V_{ZC}$/Rd after the de-assertion (i.e., a falling edge) of the switch control signal VG1, where $V_{ZC}$ is the voltage value of the zero current voltage signal $V_{ZC}$ and Rd is the rate at which the ramp signal RAMP increases when the switch control signal VG1 is de-asserted.

The SR flip-flop 558 has a set input S coupled to switch control signal VG1 and a reset input R coupled to the output of the comparator 556. The output Q of the SR flip-flop 558 produces the modified switch control signal VG2. Accordingly, the modified switch control signal VG2 is asserted when the switch control signal VG1 is asserted and de-asserted when the output of the comparator 556 is asserted.

Figure 5B:
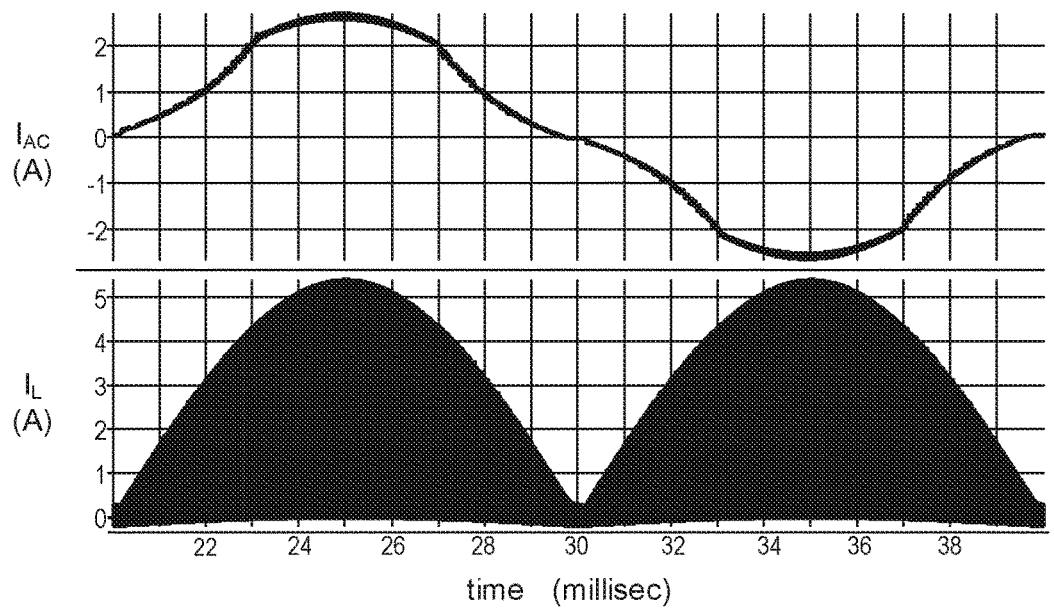
FIG. 5B includes waveforms illustrating the effect of employing the turn-off delay circuit in a PFC circuit according to an embodiment.
Figure 5B:
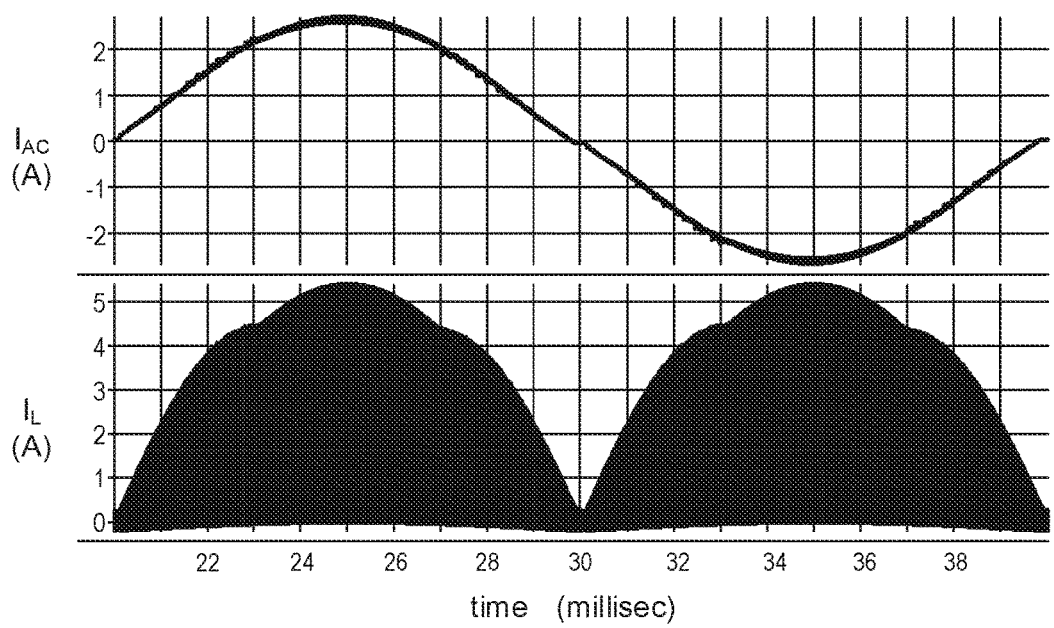

FIG. 5B includes waveforms illustrating the effect of utilizing the turn-off delay circuit 530 in a PFC circuit according to an embodiment, such as the PFC circuit 202 of FIG. 2, when operating in DCM. The upper graph illustrates an AC supply current $I_{AC}$ and an inductor current $I_L$ of an energy storage inductor (e.g., inductor 214 of FIG. 2) during operation of a PFC circuit operating in DCM without the turn-off delay circuit 530 during one cycle of a 50 Hz AC power supply. The lower graph illustrates the AC supply current $I_{AC}$ and the inductor current $I_L$ of the energy storage inductor during operation of a PFC circuit operating in DCM with the turn-off delay circuit 530 during one cycle of the 50 Hz AC power supply.

As shown in the graphs, turn-off delay circuit 530 operates to reduce the distortion (that is, to produce a waveform that better approximates a sine wave) in the AC supply current $I_{AC}$, relative to not using the turn-off delay circuit 530. Use of the turn-off delay circuit 530 also increases the average current of the inductor current $I_L$ without increasing the peak current of the inductor current $I_L$.

Figure 6A:
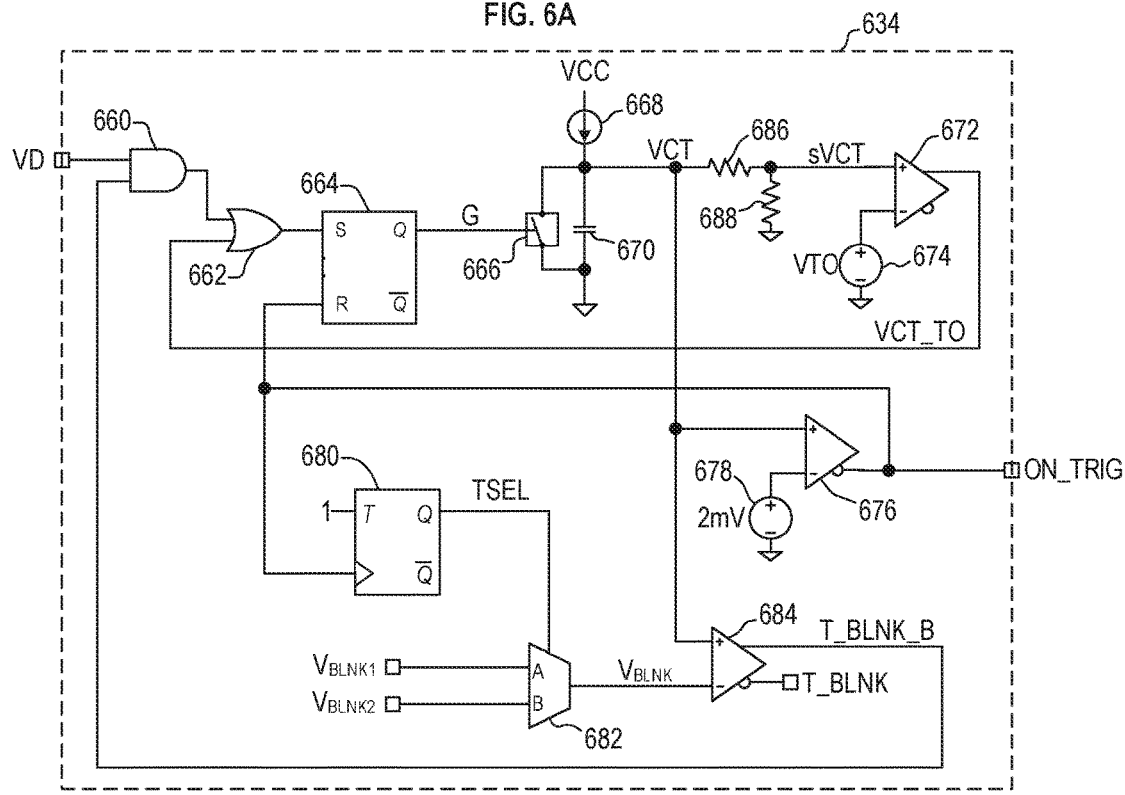
FIG. 6A illustrates an oscillator circuit according to an embodiment.

FIG. 6A illustrates an oscillator circuit 634 according to an embodiment, suitable for use as the oscillator 234 of FIG. 2. The oscillator circuit 634 receives a valley detect signal VD and generates a turn-on trigger signal ON_TRIG. The oscillator circuit 634 asserts the turn-on trigger signal ON_TRIG in response to an assertion of the valley detect signal VD when a blanking interval internal to the oscillator circuit 634 is not active (i.e., in effect). The blanking interval is initiated in response to the assertion of the turn-on trigger signal ON_TRIG.

The oscillator circuit 634 comprises an AND gate 660, an OR gate 662, a Set-Reset (SR) flip-flop 664, a reset switch 666, a current source 668, and a capacitor 670, which together operate to produce a ramp voltage VCT. The oscillator circuit 634 further comprises first, second, and third comparators 672, 676, and 684 that receive the ramp signal VCT, first and second voltage sources 674 and 678 that provide thresholds to the first and second comparators 672 and 676, respectively, and a Toggle (T) flip-flop 680 and an analog multiplexer 682 that provide a blanking time threshold voltage $V_{BLNK}$ to the third comparator 684.

The AND gate 660 receives the valley detect signal VD and a blanking inactive signal T_BLNK_B. The blanking inactive signal T_BLNK_B is low when the blanking interval is in effect and high otherwise. Accordingly, a positive-going pulse on the valley detect signal VD produces a positive-going pulse on the output of the AND gate 660 when the blanking interval is not in effect.

The OR gate 662 receives the output of the AND gate 660 and a ramp voltage time out signal VCT_TO. The ramp voltage time out signal VCT_TO is asserted when the ramp voltage VCT exceeds a predetermined ramp time out voltage VTO. The ramp voltage time out signal VCT_TO operates to establish a minimum operational frequency of the PFC circuit that includes the oscillator circuit 634, as explained below.

Accordingly, the output of the OR gate is asserted when either a positive-going pulse occurs on the valley detect signal VD when the blanking interval is not active or when the ramp voltage time out signal VCT_TO is asserted. The output of the OR gate is coupled to a set (S) input of the SR flip-flop 664. Accordingly, the SR flip-flop 664 produces a switch control signal G having a high value when the output of the OR gate is asserted.

The current source 668 is connected to a first terminal of the capacitor 670, and the second terminal of the capacitor 670 is connected to ground. The reset switch 666 has first and second conduction terminals respectively connected to the first and second terminals of the capacitor 670, and a control terminal of the reset switch 666 receives the switch control signal G. In an illustrative embodiment, the current source 668 provides 1 milliamp (ma) of current, the capacitor 670 has a capacitance of 1000 picofarads (pF), and the reset switch 666 is an n-channel MOSFET.

The ramp voltage VCT is produced at the first terminal of the capacitor 670. The ramp voltage VCT is reset to a value of 0V by the reset switch 666 when the switch control signal G has a high value. The ramp voltage VCT increases at a ramp rate determined by the current provided by the current source 668 and the capacitance of the capacitor 670 when the switch control signal G has a low value. In an embodiment, the ramp rate is 1 volt per µs.

A voltage divider comprising a first resistor 686 and a second resistor 688 receives the ramp voltage VCT and produces a scaled ramp voltage sVCT. The first comparator 672 compares the scaled ramp voltage sVCT to the voltage value of the first voltage source 674 (the ramp time out voltage VTO) to produce the ramp voltage time out signal VCT_TO. The first comparator 672 de-asserts the ramp voltage time out signal VCT_TO when the scaled ramp voltage sVCT is less than the ramp time out voltage VTO, and asserts the ramp voltage time out signal VCT_TO when the scaled ramp voltage sVCT is greater than the ramp time out voltage VTO. In an illustrative embodiment wherein the ramp rate of the ramp voltage VCT is 1 volt per µs, the scaled ramp voltage sVCT is one-tenth of the ramp voltage VCT, and the ramp time out voltage VTO is 4 volts (corresponding to a ramp voltage VCT of 40 volts), the corresponding time out time is 40 µs, establishing a minimum operational frequency of 1/40 µs=25 KHz.

The second comparator 676 compares the ramp voltage VCT to the voltage value of the second voltage source 678 to produce the turn-on trigger signal ON_TRIG. The second comparator 676 asserts the turn-on trigger signal ON_TRIG when the ramp voltage VCT is less than the voltage value of the second voltage source 678, and de-asserts the turn-on trigger signal ON_TRIG when the ramp voltage VCT is greater than the voltage value of the second voltage source 678.

The second comparator 676 therefore operates to assert the assert the turn-on trigger signal ON_TRIG when the ramp voltage VCT is reset to 0V, and to de-assert the turn-on trigger signal ON_TRIG once the ramp voltage VCT rises above the voltage value of the second voltage source 678, thereby generating a positive-going pulse on the turn-on trigger signal ON_TRIG. In an illustrative embodiment where the ramp rate of the ramp voltage VCT is 100 millivolts per µs, the voltage value of the second voltage source 678 is 2 millivolts, corresponding to a pulse width of 20 nanoseconds.

The turn-on trigger signal ON_TRIG is output from the oscillator circuit 634, and is also provided to the Reset (R) input of the SR flip-flop 664 and the clock input of the T flip-flop 680. Therefore, the positive-going pulse on the turn-on trigger signal ON_TRIG causes the switch control signal G to be de-asserted, opening the reset switch 666 and allowing the ramp voltage VCT to increase. The positive-going pulse on the turn-on trigger signal ON_TRIG also causes the T flip-flop 680 to toggle, so that the time select signal TSEL produced by the T flip-flop 680 alternates between 0 and 1 as successive positive-going pulse occur on the turn-on trigger signal ON_TRIG.

The analog multiplexer 682 receives the time select signal TSEL and first and second blanking time voltages $V_{BLNK1}$ and $V_{BLNK2}$, and produces a selected blanking time voltage $V_{BLNK}$. The analog multiplexer 682 produces the selected blanking time voltage $V_{BLNK}$ having a value equal to the first blanking time voltages $V_{BLNK1}$ when the time select signal TSEL has a value of 0, and produces the selected blanking time voltage $V_{BLNK}$ having a value equal to the second blanking time voltages $V_{BLNK2}$ when the time select signal TSEL has a value of 1.

The T flip-flop 680 operates as a 1-bit counter with wrap-around that counts the number of pulses on the turn-on trigger signal ON_TRIG; that is, the number of operational cycles of a PFC circuit including the oscillator 634, the count selecting one of two predetermined blanking time voltage, but embodiments are not limited thereby. In an embodiment, a multi-bit counter with wrap around may be used to count the pulses on the turn-on trigger signal ON_TRIG, and the count may be used to select one from among three or more predetermined blanking time voltages.

Embodiments of the oscillator circuit 634 determines a selected blanking time BT from among a set S of M predetermined blanking times by determining a count N corresponding to a number of cycles C of operation of the PFC circuit modulo the number of predetermined blanking times M, and determining that the selected blanking time BT is equal to the $N^{th}$ predetermined blanking time of the set S:

$$N=C \text{ modulo } M, \quad \text{Eq. 1}$$

$$BT=S[N]. \quad \text{Eq. 2}$$

The third comparator 684 compares the ramp voltage VCT and the selected blanking time voltage $V_{BLNK}$ to generate the blanking inactive signal T_BLNK_B. When the ramp voltage VCT is less than selected blanking time voltage $V_{BLNK}$, the third comparator 684 de-asserts the blanking inactive signal T_BLNK_B. When the ramp voltage VCT is greater than selected blanking time voltage $V_{BLNK}$, the third comparator 684 asserts the blanking inactive signal T_BLNK_B. In the illustration, the third comparator 684 also produces a banking active T_BLNK that is the logical complement of the blanking inactive signal T_BLNK_B.

In an embodiment where the ramp rate of the ramp voltage VCT is 100 millivolts per μs, a predetermined value of the first blanking time voltage VBLNK1 is 700 millivolts, corresponding to a blanking time duration of 7 μs, and a predetermined value of the second blanking time voltage $V_{BLNK2}$ is 720 millivolts, corresponding to a blanking time duration of 7.2 μs. In the embodiment, the value of the selected blanking time voltage $V_{BLNK}$ alternates between 700 and 720 millivolts with each pulse of the turn-on trigger signal ON_TRIG, and as a result the duration of the blanking time alternates between 7 and 7.2 μs.

In another embodiment of the oscillator circuit 634, the selected blanking time voltage $V_{BLNK}$ is provided by adding a predetermined offset voltage to a predetermined blanking time voltage during odd-numbered operational cycle, and not adding the predetermined offset voltage to a predetermined blanking time voltage during even-numbered operational cycles. In another embodiment of the oscillator circuit 634, the selected blanking time voltage $V_{BLNK}$ is provided by adding a first predetermined offset voltage to a predetermined blanking time voltage during odd-numbered operational cycle, and adding a second predetermined offset voltage to a predetermined blanking time voltage during even-numbered operational cycles.

The embodiment of the oscillator circuit 634 illustrated in FIG. 6A operates using two alternating blanking times, but embodiments are not limited thereto. In an embodiment, the oscillator circuit 634 uses only one blanking time.

Figure 6B:
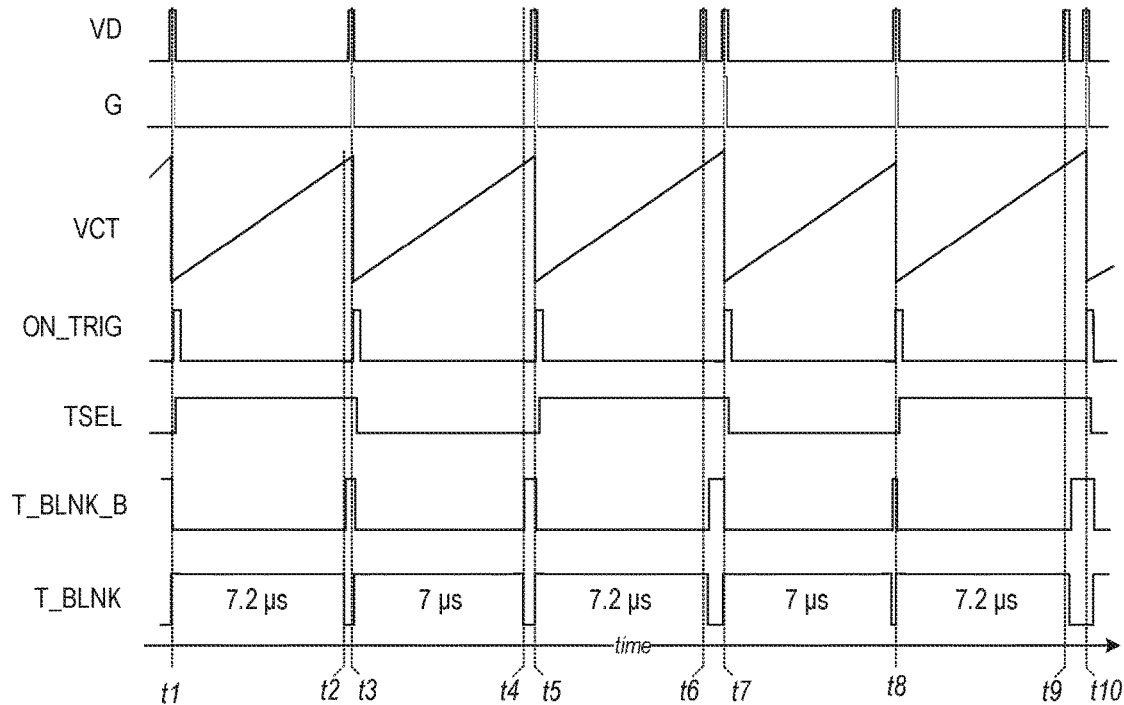
FIG. 6B includes waveforms illustrating operation of the oscillator circuit according to an embodiment.

FIG. 6B illustrates operations of the oscillator circuit 634 shown in FIG. 6A. Shown in FIG. 6B are the valley detect signal VD, the switch control signal G, the ramp voltage VCT, the turn-on trigger signal ON_TRIG, the time select signal TSEL, the blanking inactive signal T_BLNK_B, and the blanking active signal T_BLNK.

At a first time t1, a first pulse arrives on the valley detect signal VD when the blanking inactive signal T_BLNK_B is asserted, that is, after the previous (not shown) blanking time. As a result, the switch control signal G is asserted by the SR flip-flop 664, which causes the reset switch 666 to close, discharging the capacitor 670 and resetting the ramp voltage VCD to 0V. This causes the second comparator 676 to assert the turn-on trigger signal ON_TRIG. The resetting of the ramp voltage VCD to 0 V also causes the third comparator 684 to de-assert the blanking inactive signal T_BLNK_B and assert the blanking active signal T_BLNK.

The assertion of the turn-on trigger signal ON_TRIG resets the SR flip-flop 664, which causes the reset switch 666 to open, allowing the ramp voltage VCD to rise at the ramp rate. The assertion of the turn-on trigger signal ON_TRIG also toggles the T flip-flop 680, causing the second blanking time voltage $V_{BLNK2}$ to be selected as the selected blanking time voltage $V_{BLNK}$. In the embodiment illustrated, the second blanking time voltage $V_{BLNK2}$ has a voltage value corresponding to a blanking time of 7.2 μs.

Shortly after the reset switch 666 is opened by the assertion of the turn-on trigger signal ON_TRIG, the ramp voltage VCT rises above the value of the second voltage source 678, causing the turn-on trigger signal ON_TRIG to be de-asserted.

At a second time t2, which occurs 7.2 μs after the first time t1, the ramp voltage VCT rises above the selected blanking time voltage $V_{BLNK}$, causing the third comparator 684 to assert the blanking inactive signal T_BLNK_B and de-assert the blanking active signal T_BLNK.

At a third time t3, a second pulse arrives on the valley detect signal VD. Because the blanking inactive signal T_BLNK_B is de-asserted at the third time t3, the second pulse causes the switch controls signal G to be asserted, and operation of the circuit proceeds as described for the first time t1, except that the toggling of the T flip-flop 680 causes the first blanking time voltage $V_{BLNK1}$ to be selected as the selected blanking time voltage $V_{BLNK}$. In the embodiment illustrated, the first blanking time voltage $V_{BLNK1}$ has a voltage value corresponding to a blanking time of 7 μs.

At a fourth time t4, which occurs 7 μs after the first time t1, the ramp voltage VCT rises above the selected blanking time voltage $V_{BLNK}$, causing the third comparator 684 to assert the blanking inactive signal T_BLNK_B and de-assert the blanking active signal T_BLNK.

At a fifth time t5, a third pulse arrives on the valley detect signal VD. Because the blanking inactive signal T_BLNK_B is de-asserted at the fifth time t5, the third pulse causes the switch controls signal G to be asserted, and operation of the circuit proceeds as described for the first time t1, with the second blanking time voltage $V_{BLNK2}$ selected as the selected blanking time voltage $V_{BLNK}$.

At a sixth time t6, a fourth pulse arrives on the valley detect signal VD. However, the fourth pulse arrives less than 7.2 μs after the fifth time t5, and therefore the blanking inactive signal T_BLNK_B is still de-asserted. As a result, the oscillator circuit 634 ignores the fourth pulse.

At a seventh time t7, a fifth pulse arrives on the valley detect signal VD. Because the blanking inactive signal T_BLNK_B is de-asserted at the seventh time t7, the fifth pulse causes the switch controls signal G to be asserted, and operation of the circuit proceeds as described for the third time t3, with the first blanking time voltage $V_{BLNK1}$ selected as the selected blanking time voltage $V_{BLNK}$.

At an eighth time t8, a sixth pulse arrives on the valley detect signal VD. Because the blanking inactive signal T_BLNK_B is de-asserted at the an eighth time t8, the sixth pulse causes the switch controls signal G to be asserted, and operation of the circuit proceeds as described for the first time t1, with the second blanking time voltage $V_{BLNK2}$ selected as the selected blanking time voltage $V_{BLNK}$.

At a ninth time t9, a seventh pulse arrives on the valley detect signal VD. However, the fourth pulse arrives less than 7.2 µs after the eighth time t8, and therefore the blanking inactive signal T_BLNK_B is still de-asserted. As a result, the oscillator circuit 634 ignores the seventh pulse.

At a tenth time t10, an eighth pulse arrives on the valley detect signal VD. Because the blanking inactive signal T_BLNK_B is de-asserted at the tenth time t10, the eighth pulse causes the switch controls signal G to be asserted, and operation of the circuit proceeds as described for the third time t3, with the first blanking time voltage $V_{BLNK1}$ selected as the selected blanking time voltage $V_{BLNK}$.

Figure 6C:
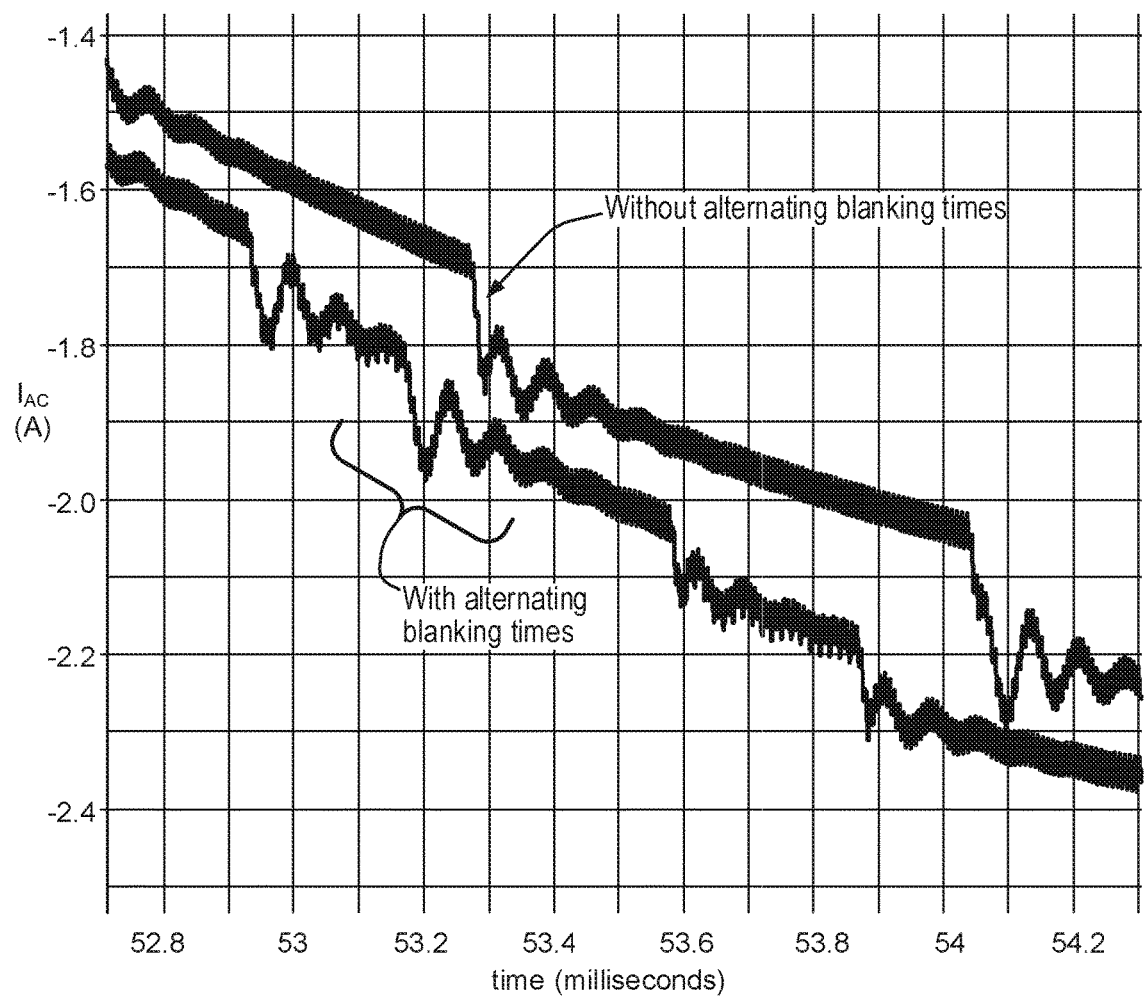
FIG. 6C includes waveforms includes waveforms illustrating the effect of employing the oscillator circuit in a PFC circuit according to an embodiment.

FIG. 6C includes waveforms illustrating the effect of employing the oscillator circuit 634 in a PFC circuit according to an embodiment, such as the PFC circuit 202 of FIG. 2, when operating in DCM. FIG. 6C illustrates the AC supply current $I_{AC}$ during a period when the PFC circuit is operating in DCM and the switching is changing from switching in a fourth valley to switching in a third valley. An upper waveform shows the AC supply current $I_{AC}$ when an oscillator circuit uses a fixed blanking time. A lower waveform shows the AC supply current $I_{AC}$ when the oscillator circuit 634 alternates the blanking time between 7 and 7.2 µs during successive operational cycles of the PFC circuit.

In FIG. 6C, the PFC circuit using the fixed blanking frequency changes from switching in the fourth valley to switching in the third valley just before the 53.5 millisecond mark, which causes a glitch in the AC supply current $I_{AC}$. In contrast, the PFC circuit using the oscillator circuit 634 transitions from switching in the fourth valley to alternating between switching in the fourth and third valleys during the period between 53.1 and 53.3 millisecond, before transitioning to switching in the third valley at around 53.3 millisecond, which results in reduction of the glitch in the AC supply current $I_{AC}$.

The same effects can be seen in the period between 53.8 and 54.2 milliseconds, wherein the PFC circuit without the oscillator circuit 634 introduces a large glitch when abruptly transitioning from third valley switching to second valley switching. In comparison, the PFC circuit with the oscillator circuit 634 introduces a smaller glitch by less abruptly changing from third valley switching to second valley switching, lowering the Total Harmonic Distortion (THD) of the PFC circuit.

Embodiments provide Power Factor Correct (PFC) using a limited switching frequency, reduced line current distortion, increased Power Factor (PF), and reduced THD of an AC power supply coupled to the PFC circuit.

Embodiments of the present disclosure include electronic devices configured to perform one or more of the operations described herein. However, embodiments are not limited thereto.

While illustrative embodiments have been disclosed to aid in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. A Power Factor Correction (PFC) circuit, the PFC circuit comprising:
an oscillator circuit to:
receive a valley detect signal indicating a zero current condition;
determine a count N corresponding to a count of operational cycles of the PFC circuit modulo a cardinality of a plurality of predetermined blanking times;
determine a blanking time as being the $N^{th}$ predetermined blanking time of the plurality of predetermined blanking times; and
determine to initiate an operational cycle of the PFC circuit according to the valley detect signal and the blanking time.

2. The PFC circuit of claim 1, wherein the cardinality of the plurality of predetermined blanking times is two.

3. The PFC circuit of claim 1,
wherein the PFC circuit operates in a Boundary Conduction Mode (BCM) when a duration of a charge-discharge period of the operational cycle is greater than the blanking time, and
wherein the PFC circuit operates in a Discontinuous Conduction Mode (DCM) when the duration of a charge-discharge period of the operational cycle is less than the blanking time.

4. The PFC circuit of claim 3, further comprising:
a first feedback loop circuit to determine, according to an output voltage of the PFC circuit, a first duration of a charging period of the operational cycle; and
a second feedback loop circuit to determine a delay time according to zero current times of one or more previous operational cycles and to extend the first duration of the charging period by the delay time.

5. The PFC circuit of claim 4, wherein a first control signal is generated by the first feedback loop circuit and has a first pulse that is asserted for a duration corresponding to the first duration, the PFC circuit further comprising:
a turn off delay circuit included in the second feedback loop circuit, the turn off delay circuit to receive the first control signal and to:
assert a second control signal immediately in response to an assertion of the first control signal; and
de-assert the second control signal after the delay time in response to a de-assertion of the first control signal.

6. The PFC circuit of claim 4, wherein the delay time is zero when the PFC circuit operates in BCM, and is greater than zero when the PFC circuit operates in DCM.

7. The PFC circuit of claim 1, wherein the oscillator circuit determines to initiate the operational cycle in response to the valley detect signal indicating the zero current condition after a blanking time of an immediately previous operational cycle has expired.

8. The PFC circuit of claim 1, wherein the blanking time begins at the time the operational cycle is initiated.

9. A method for controlling a PFC circuit, the method comprising:
producing a valley detect signal indicating a zero current condition;
determining a count N corresponding to a count of operational cycles of the PFC circuit modulo a cardinality of a plurality of predetermined blanking times;

selecting a blanking time from the plurality of predetermined blanking times according to the count N; and
determine to initiate an operational cycle of the PFC circuit according to the valley detect signal and the blanking time.

10. The method of claim 9, wherein the cardinality of the plurality of predetermined blanking times is two.

11. The method of claim 9, further comprising:
operating the PFC circuit in a Boundary Conduction Mode (BCM) when a duration of a charge-discharge period of the operational cycle is greater than the blanking time, and
operating the PFC circuit in a Discontinuous Conduction Mode (DCM) when the duration of a charge-discharge period of the operational cycle is less than the blanking time.

12. The method of claim 11, further comprising:
determining, according to an output voltage of the PFC circuit, a first duration of a charging operation of the operational cycle;
determining a delay time according to zero current times of one or more previous operational cycles; and
extending the first duration of the charging operation by the delay time.

13. The method of claim 12, further comprising:
generating a first control signal having a first pulse that is asserted for a duration corresponding to the first duration;
asserting a second control signal immediately in response to an assertion of the first control signal;
de-assert the second control signal after the delay time in response to a de-assertion of the first control signal; and
performing the charging operation when the second control signal is asserted.

14. The method of claim 12, wherein the delay time is zero when the PFC circuit operates in BCM, and is greater than zero when the PFC circuit operates in DCM.

15. The method of claim 9, further comprising:
determining to initiate the operational cycle in response to the valley detect signal indicating the zero current condition after a blanking time of an immediately previous operational cycle has expired.

16. The method of claim 9, wherein the blanking time begins at the time the operational cycle is initiated.

17. A Power Factor Correction (PFC) circuit, the PFC circuit comprising:
a current sense circuit to generate a current sense signal according to a sensed current;
a zero current detector circuit to generate a valley detect signal using the current sense signal;
an oscillator circuit to receive the valley detect signal, select a blanking time from among a plurality of predetermined blanking times according to a count of operational cycles of the PFC circuit, and generate an on trigger signal according to the valley detect signal and the blanking time; and
a first feedback circuit to determine a first duration of a gate control signal according to an output voltage of the PFC circuit,
wherein the PFC circuit initiates a charging operation in response to an assertion of the on trigger signal, and terminates the charging operation after the first duration has elapsed after initiating the charging operation.

18. The PFC circuit of claim 17, further comprising:
a second feedback circuit to determine a delay time according to a duty cycle of the sensed current,
wherein the PFC circuit terminates the charging operation after a second duration has elapsed after initiating the charging operation, the second duration being equal to the first duration plus the delay time.

* * * * *